United States Patent
Yang

(10) Patent No.: US 12,487,760 B2
(45) Date of Patent: *Dec. 2, 2025

(54) MEMORY DEVICES HAVING PROTECTION CIRCUIT FOR PROTECTING WORD LINE

(71) Applicant: NANYA TECHNOLOGY CORPORATION, New Taipei (TW)

(72) Inventor: Wu-Der Yang, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 29 days.

This patent is subject to a terminal disclaimer.

(21) Appl. No.: 18/367,602

(22) Filed: Sep. 13, 2023

(65) Prior Publication Data

US 2025/0085869 A1    Mar. 13, 2025

(51) Int. Cl.
*G06F 3/06* (2006.01)

(52) U.S. Cl.
CPC ............ *G06F 3/062* (2013.01); *G06F 3/0658* (2013.01); *G06F 3/0673* (2013.01)

(58) Field of Classification Search
CPC ...... G06F 3/061; G06F 3/0673; G06F 3/0658; G06F 3/062
USPC ......................................................... 711/106
See application file for complete search history.

(56) References Cited

U.S. PATENT DOCUMENTS

| | | | | |
|---|---|---|---|---|
| 6,125,440 A | * | 9/2000 | Osovets | G06T 1/20 712/205 |
| 9,015,508 B2 | * | 4/2015 | Yoshida | G06F 1/04 713/323 |
| 9,805,782 B1 | * | 10/2017 | Liou | G11C 11/4085 |
| 11,222,686 B1 | * | 1/2022 | Noguchi | G11C 7/065 |
| 2015/0162067 A1 | * | 6/2015 | Kim | G11C 11/406 365/222 |
| 2019/0155576 A1 | * | 5/2019 | Wang | G06F 7/58 |
| 2022/0165319 A1 | * | 5/2022 | Yang | G11C 11/4096 |

* cited by examiner

*Primary Examiner* — Jared I Rutz
*Assistant Examiner* — Edward Waddy, Jr.
(74) *Attorney, Agent, or Firm* — Xuan Zhang

(57) ABSTRACT

A memory device and a method for protecting the same are provided. The memory device includes a controller configured to refresh one of a plurality of word lines during a first refresh cycle in response to a refresh signal, a random number generator configured to generate a first number, a counter configured to receive the first number as an initial value of the counter, wherein the counter is configured to be turned on in response to the refresh signal, and an address register configured to store an address of a first word line active when the counter decrements to zero. The controller is configured to obtain the address of the first word line and protect a second word line during a second refresh cycle, wherein an address of the second word line is adjacent to the address of the first word line.

17 Claims, 8 Drawing Sheets

MEMORY DEVICES HAVING PROTECTION CIRCUIT FOR PROTECTING WORD LINE

TECHNICAL FIELD

The present disclosure relates to a memory device and a method of protecting the same, and more particularly, to a memory device including a protection circuit for protecting a word line.

DISCUSSION OF THE BACKGROUND

Dynamic random access memory (DRAM) is a type of random access memory that stores each bit of data in a separate capacitor. At their simplest, DRAM cells comprise a single transistor and a single capacitor. If charges are stored in the capacitor, the cell is said to store a logic HIGH, depending on the convention used. If no charge is stored, the cell is said to store a logic LOW. Since the charges in the capacitor dissipate over time, DRAM systems require additional refreshing circuitries to periodically refresh the charges stored in the capacitors. Since a capacitor can store only a very limited number of charges, in order to quickly distinguish between a logic "1" and a logic "0", two bit-lines (BLs) are typically used for each bit, wherein the first of the pair is known as a bit line true (BLT) and the other the bit line complement (BLC). The single transistor's gate is controlled by a word line (WL).

Row hammer, an unintended and undesirable side effect in DRAM which presents a security concern, occurs when memory cells interact electrically by charge leakage, potentially changing the contents of nearby memory rows (word lines) not addressed in the original memory access. Row hammer can be triggered by specific memory access patterns that rapidly activate the same memory rows (word lines) multiple times. Accordingly, memory cells connected to the adjacent word lines can experience charge leakage and may have difficulty retaining original content until the next periodical refresh cycle. Malicious operators can use row hammer effect to change the content of nearby memory rows, resulting in device malfunction. Therefore, it is desirable to develop a means of protecting the memory device (particularly, the word lines) to alleviate the problems described.

This Discussion of the Background section is provided for background information only. The statements in this Discussion of the Background are not an admission that the subject matter disclosed herein constitutes prior art with respect to the present disclosure, and no part of this Discussion of the Background may be used as an admission that any part of this application constitutes prior art with respect to the present disclosure.

SUMMARY

One aspect of the present disclosure provides a memory device. The memory device includes an array of memory cells, including a plurality of word lines, a controller configured to refresh at least one of the plurality of word lines during a first refresh cycle in response to a refresh signal, a random number generator configured to generate a first number, a counter electrically coupled to the random number generator and configured to receive the first number as an initial value of the counter, wherein the counter is configured to be turned on in response to the refresh signal, and an address register electrically coupled to the counter and configured to store an address of a first word line being active when the counter decrements to zero. The controller is configured to access the address register to obtain the address of the first word line and protect a second word line during a second refresh cycle, wherein an address of the second word line is adjacent to the address of the first word line.

Another aspect of the present disclosure provides a memory device. The memory device includes a plurality of word lines, a controller configured to refresh one of the plurality of word lines during a first refresh cycle in response to a refresh signal, a random number generator configured to generate a first number, a counter configured to receive the first number as an initial value of the counter and start counting from the initial value in response to the refresh signal. The counting of the counter is triggered by an access signal indicative of an access to one of the plurality of word lines. The controller is configured to obtain an address of a first word line that is accessed when the counter reaches zero, and refresh a second word line during a second refresh cycle, wherein an address of the second word line is adjacent to the address of the first word line.

Another aspect of the present disclosure provides a method for protecting a memory device, wherein the memory device includes a plurality of word lines. The method includes refreshing a first word line of the plurality of word lines during a first refresh cycle in response to a refresh signal; generating a first number by a random number generator; starting counting down from the first number by a counter in response to the refresh signal; obtaining, by a controller, an address of a second word line that is accessed when the counter counting down to zero; protecting a third word line during a second refresh cycle by refreshing the third word line in response to the refresh signal, wherein an address of the third word line is adjacent to the address of the second word line.

The embodiments of the present disclosure provide a memory device having a protection circuit for selecting and protecting a vulnerable word line. In particular, the protection circuit of the memory device can protect the word lines (memory cells) from row hammer. The row hammer is initiated by rapid activation of the same memory rows, such that adjacent unactivated memory rows may leak charges. The present protection circuit provides a random number generator and a counter, to randomly select and protect vulnerable memory rows. The counter can be configured to count down from a random number generated by the random number generator. When the counter reaches zero, an address of the memory row that is activated can be obtained. In other words, the memory row is selected from among those activated between refresh cycles. In such a case, the selection pool includes memory rows activated between refresh cycles. Because memory rows adjacent to those activated have a higher possibility of experiencing row hammer effect, they are protected in the subsequent refresh cycle.

Generally, the level of activation required to trigger the row hammer cannot be accomplished within two refresh cycles. For example, a memory device with 8192 rows can experience about 170 activations between refresh cycles, while the number of activations required to trigger the row hammer may be 10000 or more on the same row. Therefore, protection, in every refresh cycle, of additional memory rows vulnerable to row hammer effect, can prevent damage therefrom, such that security and performance of the memory device are enhanced.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It can also be appreciated by those skilled in the art that such equivalent constructions do not depart from the spirit and scope of the disclosure as set forth in the appended claims.

BRIEF DESCRIPTION OF THE DRA WINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
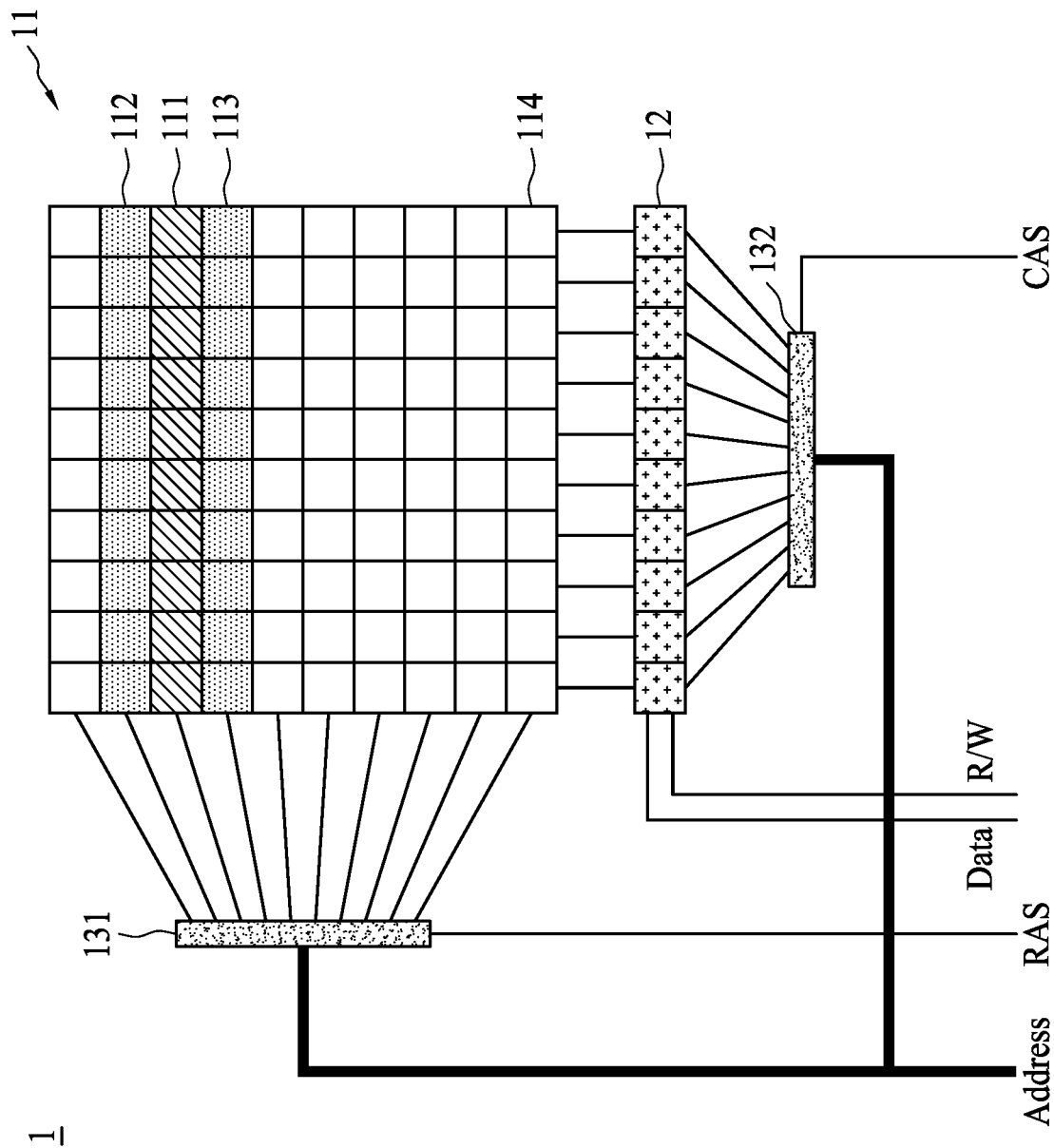
FIG. 1 is a schematic diagram of a memory device, in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc., may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

It should be noted that the term "about" modifying the quantity of an ingredient, component, or reactant of the present disclosure employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. In yet another aspect, the term "about" means within 10, 9, 8, 7, 6, 5, 4, 3, 2, or 1% of the reported numerical value.

FIG. 1 is a schematic diagram of a memory device 1, in accordance with some embodiments of the present disclosure. The memory device 1 can include an array of memory cells 11, sense amplifiers 12, a row address decoder 131, and a column address decoder 132. In some embodiments, the memory device 1 can be a DRAM.

Referring to FIG. 1, the array of memory cells 11 can include multiple rows and columns. Each column of memory cells can share one bit line or a pair of bit lines. Each row of memory cells can share one word line. In some embodiments, a single memory cell can include a capacitor and a transistor, and be configured to store a bit of data therein. The charge state of a capacitor (charged or discharged) can determine whether such memory cell stores "1" or "0" as a binary value.

In some embodiments, the memory address of the array of memory cells 11 applied to a matrix can be expressed as the row address and column address, which are processed by the row address decoder 131 and column address decoder 132. When the row address decoder 131 selects a particular row (for example, memory row 114) for a read operation (the selection is also known as row activation), bits from all memory cells in the particular row can be transferred into the sense amplifiers 12. In some embodiments, one sense amplifier 12 is dedicated for each column of memory cells to temporarily hold the data. In some embodiments, the column address decoder 132 can select the exact bit from the sense amplifiers 12. In some embodiments, the sense amplifiers 12 can be configured to receive or transmit the data in response to the read/write signal R/W. Write operations decode the addresses in a similar way, but entire rows can be rewritten for the value of a single bit to be changed.

Due to storage of data bits in capacitors that have a natural discharge rate, the state stored in the memory cells 11 may lose over time and thus periodic rewriting (charging) of all memory cells is necessary to preserve the information, a process known as refreshing. Each memory refresh cycle can refresh one or more rows of memory cells, and all the memory cells can be refreshed repeatedly in a consecutive cycle. Such memory refresh can be accomplished in multiple ways. In some embodiments, the memory refresh can be conducted by different patterns of signals, such as row address strobe (RAS) refresh, column-address-strobe-before-row-address-strobe (CAS-before-RAS) refresh (also called CBR refresh for short), and hidden refresh.

To trigger row hammer effect, the same memory row 111 is activated repeatedly at high frequency. When the frequency and number of activations to the memory row 111 is sufficient, adjacent non-activated memory rows 112 and 113 may leak charges such that data/content stored therein may be lost.

The present protection circuit provides a random number generator and a counter (detailed description of which can be found in FIG. 2), to randomly select and protect a vulnerable memory row. The counter can be configured to count down from a random number generated by the random number generator. When the counter reaches zero, an address of the memory row (such as memory row 111) that is activated can be obtained. In other words, the memory row is selected from among those activated between refresh cycles. Memory rows 112 and 113, adjacent to the activated memory row 111, are more vulnerable to row hammer effect, and thus they are protected in the subsequent refresh cycle. In some embodiments, the vulnerable memory rows 112 and 113 and a planned refresh memory row 114 can be refreshed in the subsequent refresh cycle.

Figure 2:
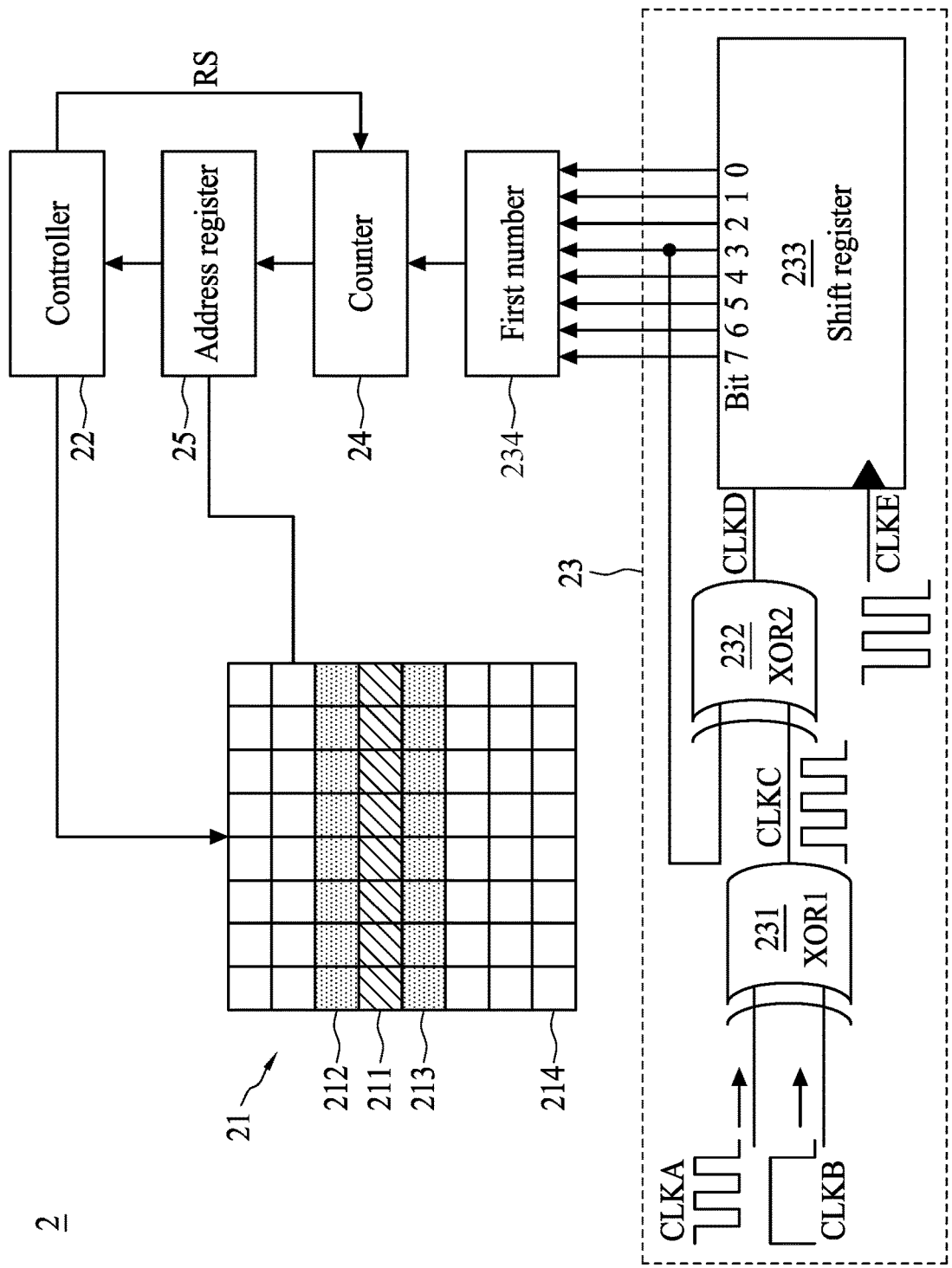
FIG. 2 is a schematic diagram of a memory device, in accordance with some embodiments of the present disclosure.

FIG. 2 is a schematic diagram of a memory device 2, in accordance with some embodiments of the present disclosure. Referring to FIG. 2, the memory device 2 can include an array of memory cells 21, a controller 22, a random number generator 23, a counter 24, and an address register 25. In some embodiments, the memory device 2 can be a dynamic random-access memory (DRAM). In some embodiments, the random number generator 23, a counter 24, and an address register 25 can be included in a protection circuit of the memory device 2.

In some embodiments, the array of memory cells 21 can include a plurality of word lines. In some embodiments, the array of memory cells 21 can include a target word line 211 being accessed, two vulnerable adjacent word lines 212 and 213 near the target word line 211, and a normal word line 214. The normal word line 214 can be located anywhere in the array 21. For example, the normal word line 214 can be an edge word line or between two other word lines. In one embodiment, the normal word line 214 can be separate from the target word line 211, and, in another embodiment, adjacent to the target word line 211 (not shown).

The controller 22 can be configured to refresh at least one of the word lines during a first refresh cycle in response to a refresh signal RS. In some embodiments, the refresh signal RS can be an RAS refresh command or CBR refresh command. The controller 22 can be configured to refresh one or more word lines during one refresh cycle. In some embodiments, the controller 22 can be configured to refresh one, two, three, four, or more word lines at the same time. In some embodiments, the controller 22 can be configured to refresh the entire array of memory cells 21 cycle by cycle.

The random number generator 23 can be configured to generate a first number 234. The first number 234 can be a positive integer. In some embodiments, the first number 234 can be in binary. The first number 234 can be greater than 2 bits. For example, the first number 234 can be 8-bit. That is, the first number 234 can be in a range of 0 to 256.

Referring to FIG. 2, the random number generator can include logic gates 231 and 232 and a shift register 233.

In some embodiments, the logic gate 231 can have a first input terminal, a second input terminal, and an output terminal. In some embodiments, the logic gate 231 can be configured to receive a first clock signal CLKA and a second clock signal CLKB through the first and second input terminals. In some embodiments, the frequency of the first clock signal CLKA is different from that of the second clock signal CLKB. The logic gate 231 can be configured to generate a third clock signal CLKC in response to the first clock signal CLKA and the second clock signal CLKB. In some embodiments, the logic gate 231 can output the third clock signal CLKC through the output terminal of the logic gate 231.

The logic gate 231 can be an OR, AND, XOR, XNOR or other gate type. In another embodiment, the logic gates 231 and 232 can be other types of logic gate (not shown).

In some embodiments, compared to the first clock signal CLKA and the second clock signal CLKB, the third clock signal CLKC can be unpredictable since it is based on a predetermined calculation in response to the first clock signal CLKA and the second clock signal CLKB. If logic gate 231 is an XOR gate, for example, in principle, the output of a two input XOR is true only when the two input values are different, and false if they are equal, regardless of value. Based on such calculation of XOR gate, the third clock signal CLKC can have a non-uniform frequency.

In some embodiments, the logic gate 232 can have a first input terminal electrically connected to the logic gate 231, a second input terminal, and an output terminal. The second input terminal and the output terminal of the logic gate 232 can be both electrically connected to the shift register 233. The logic gate 232 can be configured to receive the third clock signal CLKC through the first input terminal of the logic gate 232. In some embodiments, the second input terminal of the logic gate 232 can be configured to receive a bit value associated with the first number 234 output from the shift register 233. The logic gate 232 can be configured to generate a fourth clock signal CLKD in response to the third clock signal CLKC and the bit value associated with the first number 234. In some embodiments, the logic gate 232 can output the fourth clock signal CLKD through the output terminal of the logic gate 232.

The logic gate 232 can be an OR, AND, XOR, XNOR or other gate type. In some embodiments, the logic gates 231 and 232 can be the same or different types. For example, the logic gates 231 and 232 can both be exclusive OR (XOR) gates. In another embodiment, the logic gates 231 and 232 can be other types of logic gate (not shown).

In some embodiments, having the bit value associated with the first number 234 fed back to the logic gate 232, the fourth clock signal CLKD can be more unpredictable than the third clock signal CLKC.

The shift register 233 can include a first input terminal electrically connected to the output terminal of the logic gate 232, a second input terminal configured to receive a fifth clock signal CLKE, and an output terminal connected to the counter 24. In some embodiments, the shift register 233 is an 8-bit shift register. Therefore, the output terminal of the shift register 233 can have 8 bits (as shown in FIG. 2). In other embodiments, the shifter register 233 can be more or fewer than 8 bits.

In some embodiments, the first input terminal of the shift register 233 can be configured to receive the fourth clock signal CLKD. In some embodiments, the first input terminal of the shift register 233 can be the data terminal. In some embodiments, the second input terminal of the shift register 233 can be the clock terminal.

The shift register 233 can be configured to generate the first number 234 in response to the fourth clock signal CLKD and the fifth clock signal CLKE. In some embodiments, the output terminal of the shift register 233 can be configured to output the first number 234 in response to the fourth clock signal CLKD.

The output terminal of the shift register 233 can be connected to the second input terminal of the logic gate 232, such that a bit value associated with the first number 234 is fed back to the logic gate 232. For example, the 3-bit of the output terminal of the shift register 233 can be connected to the second input terminal of the logic gate 232. In some embodiments, the logic gate 232 can be configured to generate the fourth clock signal CLKD in response to the third clock signal CLCK and the bit value (for example, the bit value output at the 3-bit). The fourth clock signal CLKD can be associated with the present number output from the shift register 233.

The shift register 233 can be configured to generate a random number (i.e., the first number 234) in response to the fourth clock signal CLKD as the data input and the fifth clock signal CLKE as the clock input. With the bit value associated with the first number 234 fed back to the logic gate 232, the random number generator 23 can be non-pseudo. Therefore, the first number 234 can be harder to predict. Accordingly, the security of the memory device 2 can be improved.

The counter 24 can be electrically coupled to the random number generator 23. The counter 24 can be configured to receive the first number 234 as an initial value of the counter 24. In some embodiments, the counter 24 is configured to be turned on in response to the refresh signal RS received from the controller 22. In other words, the counter 24 can be configured to start counting down in response to the refresh signal RS. The counter 24 can be configured to decrement (count down) from the initial value, i.e., the first number 234.

In some embodiments, the counter 24 can be configured to decrement in response to an access signal, providing notification of access to one of the word lines.

The address register 25 can be electrically coupled to the counter 24. The address register 25 can be configured to obtain an address of a first word line 211 (or the target word line 211) being active when the counter 24 decrements to zero, and store the address.

The controller 22 can be configured to access the address register 25 to obtain the address of the first word line and protect a second word line 212/213 (i.e., the adjacent word line 212 or 213) during a second refresh cycle. To protect the second word line 212/213, the controller can be configured to refresh the second word line 212/213 during the second refresh cycle in response to the refresh signal. In some embodiments, the second refresh cycle follows the first refresh cycle. For example, the second refresh cycle is the next refresh cycle of the first refresh cycle. In some embodiments, the address of the second word line 212/213 is adjacent to the address of the first word line 211.

The controller 22 can be configured to refresh one or more word lines during one refresh cycle. In some embodiments, the controller 22 can be configured to refresh one, two, three, four, or more word lines at the same time. The controller 22 can be configured to refresh both adjacent word lines 212 and 213 during the same refresh cycle. In some embodiments, in addition to the second word line 212/213, the controller 22 can be configured to refresh a third word line 214 during the second refresh cycle in response to the refresh signal RS, where the address of the third word line 214 is separate from the address of the first word line 211.

In some embodiments, the controller 22 can be configured to refresh one word line adjacent to the target word line 211 and another word line separate from the target word line 211. For example, the word line 212 and the word line 214 can be refreshed during the second refresh cycle. In some embodiments, in one refresh cycle, the controller 22 can be configured to refresh two normal word lines (such as the word line 214) and two high risk word lines (such as the vulnerable word lines 212 and 213), which are determined by the random number generator 23 and the counter 24.

In the present disclosure, the address of the first word line 211 (or the target word line 211) that is active can be obtained when the counter 24 decrements to zero. In such case, the address of the word line to be protected can be randomly selected from those word lines active between two refresh cycles.

Figure 3:
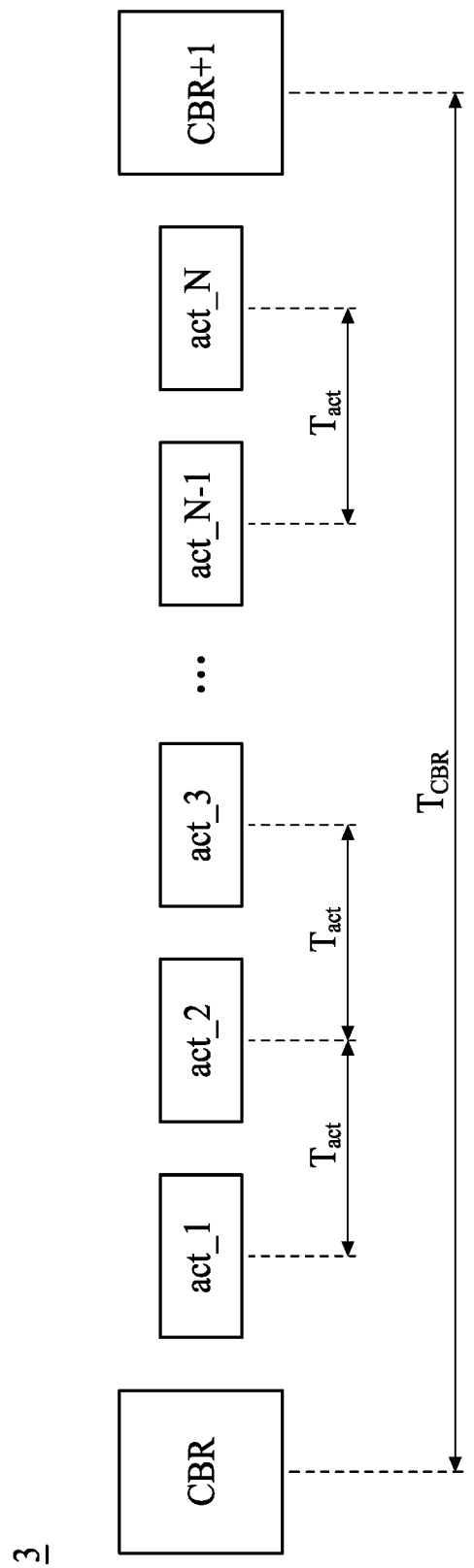
FIG. 3 is a schematic diagram illustrating activations of word lines between refresh cycles along a timeline, in accordance with some embodiments of the present disclosure.

FIG. 3 is a schematic diagram 3 illustrating activation to word lines between refresh cycles along a timeline, in accordance with some embodiments of the present disclosure.

Referring to FIG. 3, along the timeline (i.e., the x-axis), a time period $T_{CBR}$ is between a first refresh cycle CBR and a second refresh cycle CBR+1. In some embodiments, the second refresh cycle CBR+1 is next to the first refresh cycle CBR. In some embodiments, a number N of activations (act_1, act_2, act_3, ..., act_N−1, act_N) occurs between the first refresh cycle CBR and the second refresh cycle CBR+1. Each activation act_1, act_2, act_3, act_N−1, and act_N represent an access to a word line. The time period $T_{act}$ is between two activations. For example, the time period $T_{act}$ can be between the activations act_1 and act_2. In some embodiments, the time period $T_{act}$ can be the minimum essential time for accessing a word line (such as the first activation act_1).

To clearly elaborate the present disclosure, a memory array having 8 k of word lines is used as an example. The memory array can include 8192 word lines. In some embodiments, the time for refreshing all word lines (i.e., 8192 word lines) can be 64 ms. In such a case, the time period $T_{CBR}$, which is the time required for refreshing each word line, can be calculated as 64 ms/8192, and thus the time period $T_{CBR}$ would be 7.8125 μs. In other words, the time period $T_{CBR}$ shared by two refresh cycles can be 7.8125 μs for a total 8 k word lines. Assuming the time period $T_{act}$ of 45.75 ns, the maximum accessing number $N_{max}$ between two refresh cycles can be calculated according to the equation $$N_{max} = \frac{T_{CBR}}{T_{act}}.$$

Therefore, the maximum access number $N_{max}$ can be 7.8125 μs/45.75 ns=170.765≈170, which makes N in FIG. 3 170. There can be 170 word lines being accessed between two refresh cycles in this embodiment. Accordingly, the first number 234 received by the counter 24 can be modulated to be less than a predetermined number (for example, 170 in this embodiment).

In some embodiments, the first number 234 can be less than a predetermined number, which is associated with the time period $T_{act}$ for accessing a word line and the time period $T_{CBR}$ between the first refresh cycle CBR and the second refresh cycle CBR+1. In some embodiments, the counter 24 can be configured to reset the initial value when the first number 234 is greater than the predetermined number. For example, the initial value of the counter 24 can be reset by resetting to zero or minus a constant to be less than the predetermined number. Accordingly, the counter 24 can start counting down from the initial value that is in a range of 0 to the predetermined number (i.e., the maximum accessing number between two refresh cycles), and when decrements to zero a word line can be selected to be protected during the next refresh cycle.

Figure 3A:
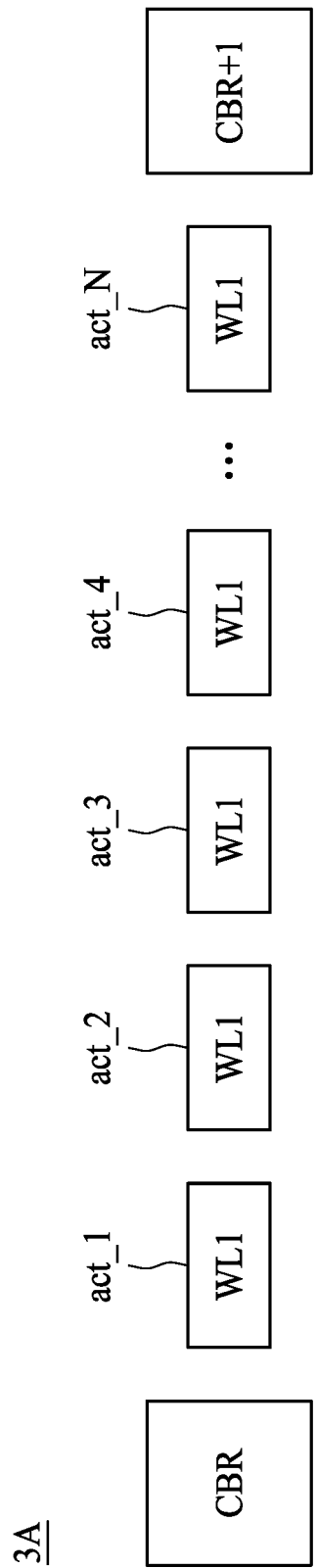
FIG. 3A is a schematic diagram illustrating accessed word line addresses at each activation between refresh cycles along a timeline, in accordance with some embodiments of the present disclosure.

FIG. 3A is a schematic diagram 3A illustrating accessed word line addresses at each activation between refresh cycles CBR and CBR+1 along a timeline, in accordance with some embodiments of the present disclosure.

Referring to FIG. 3A, the word line address WL1 is accessed at every activations act_1, act_2, act_3, act_4, ... , and act_N. In such a case, no matter the initial value of the counter 24, the address register 25 stores the word line address WL1, which is accessed the most. In other words, the word line address WL1 can be the most likely target of attack. Therefore, selecting word lines adjacent to the word line address WL1 to be protected can effectively prevent row hammer effect.

Figure 3B:
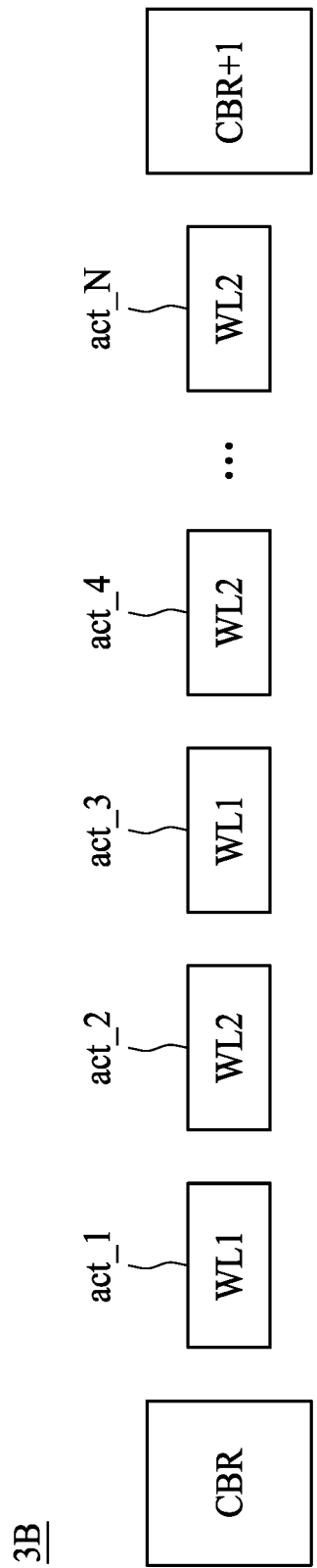
FIG. 3B is a schematic diagram illustrating accessed word line addresses at each activation between refresh cycles along a timeline, in accordance with some embodiments of the present disclosure.

FIG. 3B is a schematic diagram 3B illustrating accessed word line addresses at each activation between refresh cycles CBR and CBR+1 along a timeline, in accordance with some embodiments of the present disclosure.

Referring to FIG. 3B, the word line address WL1 is accessed at the activation act_1. The word line address WL2 is accessed at the activation act_2. The word line address WL1 is accessed at the activation act_3. The word line address WL2 is accessed at the activation act_4. The word line address WL2 is accessed at the activation act_N. That is, only word line addresses WL1 and WL2 are accessed. In such a case, no matter the initial value of the counter 24, the address register 25 stores either the word line address WL1 or WL2, which are accessed the most. In some embodiments, the possibility of the word line addresses WL1 and WL2 being the target are both 50%. In other words, the word line addresses WL1 and WL2 can be the most likely target of attack. Therefore, selecting the word lines adjacent to the word line address WL1 or WL2 to be protected can effectively prevent row hammer effect.

Figure 3C:
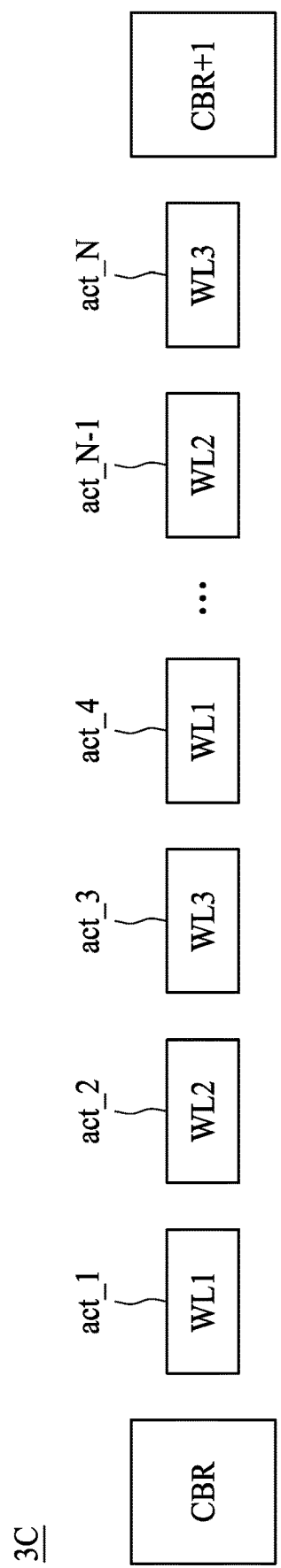
FIG. 3C is a schematic diagram illustrating accessed word line addresses at each activation between refresh cycles along a timeline, in accordance with some embodiments of the present disclosure.

FIG. 3C is a schematic diagram 3C illustrating accessed word line addresses at each activation between refresh cycles CBR and CBR+1 along a timeline, in accordance with some embodiments of the present disclosure.

Referring to FIG. 3C, the word line address WL1 is accessed at the activation act_1. The word line address WL2 is accessed at the activation act_2. The word line address WL3 is accessed at the activation act_3. The word line address WL1 is accessed at the activation act_4. The word line address WL2 is accessed at the activation act_N−1. The word line address WL3 is accessed at the activation act_N. In some embodiments, the word line addresses WL1, WL2, and WL3 are accessed in sequence repeatedly. That is, only word line addresses WL1, WL2, and WL3 are accessed between refresh cycles. In such a case, the address register 25 stores one of word line addresses WL1, WL2, and WL3. In some embodiments, vulnerability of the word line addresses WL1, WL2, and WL3 may be about 33.33% (i.e., one third). In other words, the word line addresses WL1, WL2, and WL3 can be the most likely target of attack.

Therefore, selecting the word lines adjacent to the word line address WL1, WL2, or WL3 to be protected can effectively prevent row hammer effect.

Figure 4:
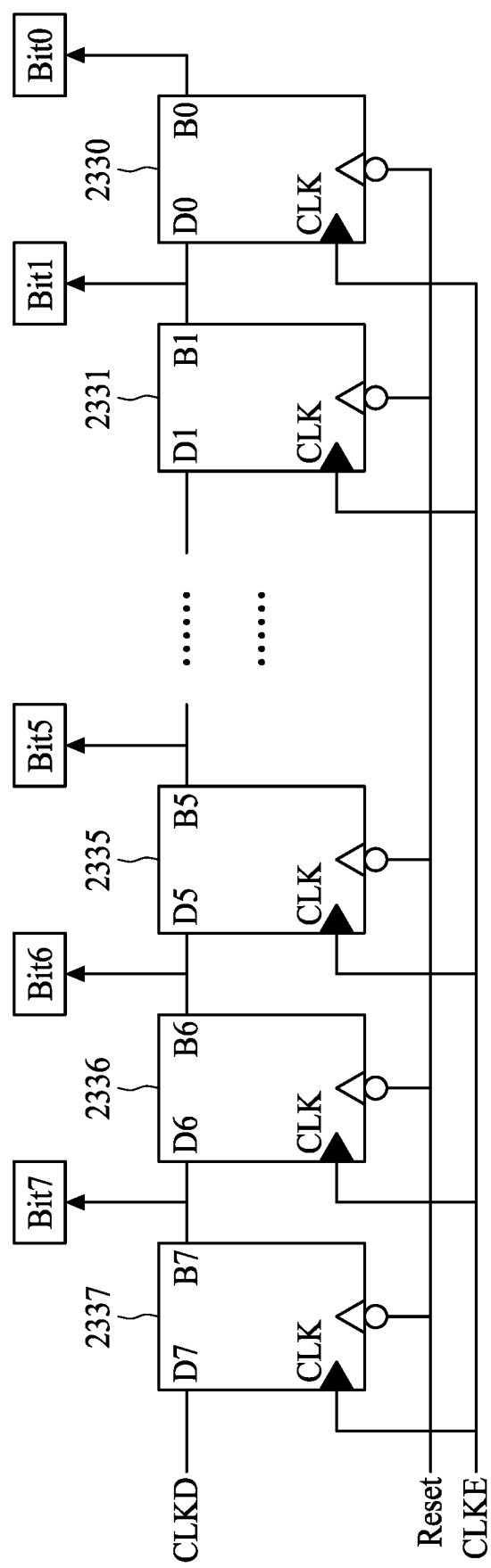
FIG. 4 is a schematic diagram of a shift register included in a memory device, in accordance with some embodiments of the present disclosure.

FIG. 4 is a schematic diagram of a shift register 233 included in a memory device, in accordance with some embodiments of the present disclosure.

Referring to FIG. 4, the shifter register 233 can include one or more flip-flops 2330, 2331, ... , 2335, 2336, and 2337. In some embodiments, the flip-flops 2330, 2331, ... , 2335, 2336, and 2337 can be any types of flip-flops, for example, D flip-flops. In some embodiments, the 8-bit shifter register 233 can include eight flip-flops 2330, 2331, ... , 2335, 2336, and 2337. In some embodiments, the shift register 233 can be serial-in parallel-out configuration.

Each of the flip-flops 2330, 2331, ... , 2335, 2336, and 2337 can have a data terminal, a clock terminal, a reset terminal and an output terminal. In some embodiments, the clock terminals of the flip-flops 2330, 2331, ... , 2335, 2336, and 2337 are connected and configured to receive the clock signal CLKE (shown in FIG. 2). That is, the flip-flops 2330, 2331, ... , 2335, 2336, and 2337 can operate at the given clock frequency of the clock signal CLKE. The reset terminals of the flip-flops 2330, 2331, ... , 2335, 2336, and 2337 are connected and configured to receive a reset signal. In some embodiments, the flip-flops 2330, 2331, ... , 2335, 2336, and 2337 can be reset in response to the reset signal. In some embodiments, each of the flip-flops 2330, 2331, ... , 2335, 2336, and 2337 can have a set terminal (not shown).

In some embodiments, the data terminal D7 of the flip-flop 2337 can be configured to receive the clock signal CLKD (shown in FIG. 2). In response to the clock signals CLKD and CLKE, the output terminal B7 of the flip-flop 2337 can be configured to output a bit value Bit7 to be transmitted to the counter 24 and the data terminal D6 of the flip-flop 2336. In response to the bit value Bit7 and the clock signal CLKE, the output terminal B6 of the flip-flop 2336 can be configured to output a bit value Bit6 to be transmitted to the counter 24 and the data terminal D5 of the flip-flop 2335. In response to the bit value Bit6 and the clock signal CLKE, the output terminal B5 of the flip-flop 2335 can be configured to output a bit value Bit5 to be transmitted to the counter 24 and the data terminal D4 of the flip-flop 2334 (not shown). In some embodiments, the omitted flip-flops 2334, 2333, and 2332 can be arranged between the flip-flops 2335 and 2331 in a manner similar to the flip-flops 2336 and 2335. In response to the bit value Bit2 received at the data terminal D1 of the flip-flop 2331 and the clock signal CLKE, the output terminal B1 of the flip-flop 2331 can be configured to output a bit value Bit1 to be transmitted to the counter 24 and the data terminal D0 of the flip-flop 2330. In response to the bit value Bit1 and the clock signal CLKE, the output terminal B0 of the flip-flop 2330 can be configured to output a bit value Bit0 to be transmitted to the counter 24.

Data input of the shift register 233 is serial. Once the data has been clocked in, it may be either read off at each output terminal simultaneously, or it can be shifted out. Each input bit makes its way down to the Nth output after N clock cycles, leading to parallel output. The bit values Bit7, Bit6, Bit5, ... , Bit1, and Bit0 can form the first number 234 in an 8-bit form. Referring back to FIG. 2, the output terminal of the shift register 233 can be connected to the second input terminal of the logic gate 232, such that a bit value associated with the first number 234 is fed back to the logic gate 232. In some embodiments, the fed back bit value can be one of the bit values Bit7, Bit6, Bit5, ... , Bit1, and Bit0 shown in FIG. 4.

The shift register 233 can be configured to generate a random number (such as the first number 234) in response to the data signal (i.e., the clock signal CLKD) and the clock signal CLKE. The unpredictable clock signal CLKC is generated based on asynchronous clock signals CLKA and CLKB through the logic gate 231. Furthermore, the clock signal CLKD may be more unpredictable since it is generated based on the unpredictable clock signal CLKC and a fed back bit value associated with the first number 234. In such a case, the clock signal CLKD can be more unpredictable. Without any pseudo algorithm, the random number generator 23 can be configured to generate a more unpredictable number. Accordingly, the protected word line address cannot be predicted or ascertained by potential attackers.

Figure 5:
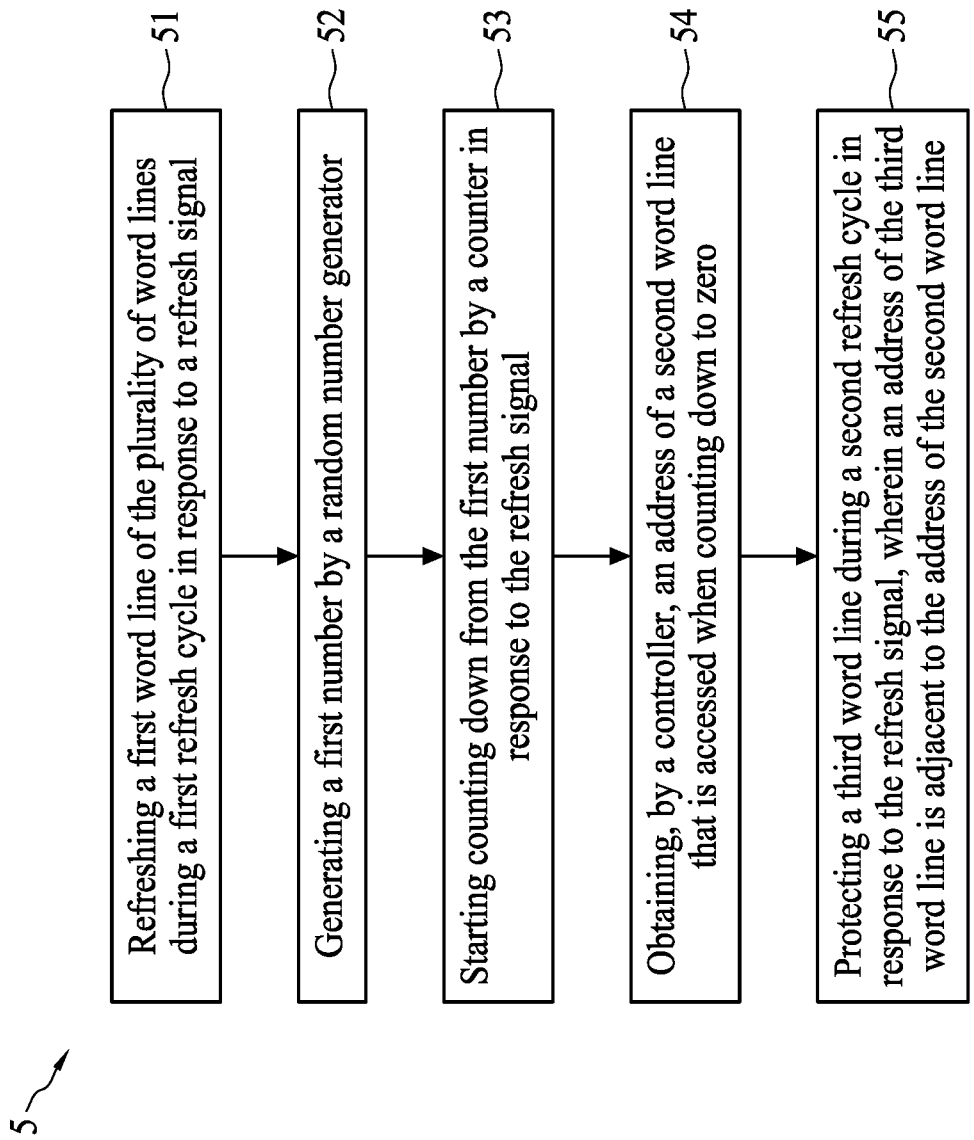
FIG. 5 is a flowchart of a method for protecting a memory device, in accordance with some embodiments of the present disclosure.

FIG. 5 is a flowchart of a method 5 for protecting a memory device, in accordance with some embodiments of the present disclosure. In some embodiments, the method 5 protects a word line included in the memory device. In some embodiments, the memory device can include a plurality of word lines.

In operation 51, a first word line of the plurality of word lines can be refreshed during a first refresh cycle in response to a refresh signal. In some embodiments, the controller of the memory device can refresh one or more word lines in each refresh cycle in response to the refresh signal.

In operation 52, a first number can be generated by a random number generator. In some embodiments, the random number generator can be configured to generate a random number based on different signals.

In operation 53, a counter can start counting down from the first number in response to the refresh signal. In some embodiments, in response to the refresh signal, the counter can be configured to be turned on to start counting. The counter can count down from the first number. In some embodiments, each countdown is triggered by an access signal indicative of an access to one word line.

In operation 54, an address of a second word line, that is accessed when the counter counting down to zero, can be obtained by a controller. In some embodiments, the address of the second word line can be obtained and stored in an address register when the counter reaches zero. The controller can be configured to access the address register and obtain the address of the second word line.

In operation 55, a third word line can be protected during a second refresh cycle by refreshing the third word line in response to the refresh signal, wherein an address of the third word line is adjacent to the address of the second word line.

Implementation of row hammer effect tends to access one or more target word lines at a high frequency. The large number of access actions to the target word line can lead to row hammer effect occurring on the word lines adjacent to the target word lines. That is, under the row hammer effect, content of nearby word lines can be affected by charge leakage, even if nearby word lines are not accessed.

The present disclosure provides a memory device that can determine if a word line is vulnerable to row hammer and protect word lines adjacent to the target word line accordingly. Word lines adjacent to the target word line undergoing repeated access can thus be refreshed to protect content therein.

One aspect of the present disclosure provides a memory device. The memory device includes an array of memory cells, including a plurality of word lines, a controller configured to refresh at least one of the plurality of word lines during a first refresh cycle in response to a refresh signal, a random number generator configured to generate a first number, a counter electrically coupled to the random number generator and configured to receive the first number as an initial value of the counter, wherein the counter is configured to be turned on in response to the refresh signal, and an address register electrically coupled to the counter and configured to store an address of a first word line being active when the counter decrements to zero. The controller is configured to access the address register to obtain the address of the first word line and protect a second word line during a second refresh cycle, wherein an address of the second word line is adjacent to the address of the first word line.

Another aspect of the present disclosure provides a memory device. The memory device includes: a plurality of word lines, a controller configured to refresh one of the plurality of word lines during a first refresh cycle in response to a refresh signal, a random number generator configured to generate a first number, a counter configured to receive the first number as an initial value of the counter and start counting from the initial value in response to the refresh signal. The counting of the counter is triggered by an access signal indicative of an access to one of the plurality of word lines. The controller is configured to obtain an address of a first word line that is accessed when the counter reaches zero, and refresh a second word line during a second refresh cycle, wherein an address of the second word line is adjacent to the address of the first word line.

Another aspect of the present disclosure provides a method for protecting a memory device, wherein the memory device includes a plurality of word lines. The method includes refreshing a first word line of the plurality of word lines during a first refresh cycle in response to a refresh signal; generating a first number by a random number generator; starting counting down from the first number by a counter in response to the refresh signal; obtaining, by a controller, an address of a second word line that is accessed when the counter counting down to zero; protecting a third word line during a second refresh cycle by refreshing the third word line in response to the refresh signal, wherein an address of the third word line is adjacent to the address of the second word line.

The embodiments of the present disclosure provide a memory device having a protection circuit for selecting and protecting vulnerable word lines. In particular, the protection circuit of the memory device can protect word lines (memory cells) from row hammer effect. Since row hammer effect rapidly activates individual memory rows, such that adjacent non-activated memory rows may leak charges, the present protection circuit provides a random number generator and a counter randomly selecting and protecting vulnerable memory rows. The counter can be configured to count down from a random number generated by the random number generator. When the counter reaches zero, an address of the memory row that is activated can be obtained. In other words, the memory row is selected from among those activated between refresh cycles. In such a case, the selecting pool includes the memory rows having activated between refresh cycles. Because the nearby memory rows adjacent to those activated memory rows are more vulnerable to row hammer effect, they will be the protected target in the subsequent refresh cycle.

Generally, the number of activation actions necessary to trigger the row hammer cannot be accomplished within two refresh cycles. For example, a memory device with 8192 rows can have about 170 activations between two refresh cycles, and the activation amount for triggering the row hammer to the same row may be 10000 or more. Therefore, protecting additional vulnerable memory rows in every refresh cycle eliminates danger from row hammer effect, enhancing security and performance of the memory device.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A memory device, comprising:
   an array of memory cells, including a plurality of word lines;
   a controller configured to refresh at least one of the plurality of word lines during a first refresh cycle in response to a refresh signal;
   a random number generator configured to generate a first number;
   a counter electrically coupled to the random number generator and configured to receive the first number as an initial value of the counter, wherein the counter is configured to be turned on in response to the refresh signal; and
   an address register electrically coupled to the counter and configured to store an address of a first word line being active when the counter decrements to zero,
   wherein the controller is configured to access the address register to obtain the address of the first word line and protect a second word line during a second refresh cycle, wherein an address of the second word line is adjacent to the address of the first word line;
   wherein the counter is configured to decrement in response to an access signal, wherein the access signal is indicative of an access to one of the plurality of word lines;
   wherein the random number generator comprises:
   a shift register including:
   a first input terminal; and
   an output terminal configured to output the first number; and
   a first logic gate configured to receive a first clock signal and a bit value associated with the first number, the first logic gate configured to generate a second clock signal in response to the first clock signal and the bit value and transmit the second clock signal to the first input terminal of the shift register,
   wherein the shift register is configured to generate the first number in response to the second clock signal.

2. The memory device of claim 1, wherein the random number generator further comprises:
   a second logic gate configured to receive a third clock signal and a fourth clock signal, and generate the first clock signal in response to the third and fourth clock signals, wherein a frequency of the first clock signal is different from a frequency of the second clock signal.

3. The memory device of claim 1, wherein the first number is in binary and greater than 2-bit.

4. The memory device of claim 1, wherein the shift register is an 8-bit shift register.

5. The memory device of claim 1, wherein the first logic gate is an XOR gate.

6. The memory device of claim 1, wherein the shift register include two or more flip-flops.

7. The memory device of claim 1, wherein the controller is configured to refresh the second word line during the second refresh cycle in response to the refresh signal.

8. The memory device of claim 7, wherein the controller is configured to refresh a third word line during the second refresh cycle in response to the refresh signal, wherein an address of the third word line is apart from the address of the first word line.

9. The memory device of claim 1, wherein the first number is a positive integer.

10. The memory device of claim 9, wherein the first number is less than a first predetermined number, wherein the first predetermined number is associated with a first time period for accessing a word line and a second time period between the first refresh cycle and the second refresh cycle.

11. The memory device of claim 10, wherein the counter is configured to reset the initial value when the first number is greater than the first predetermined number.

12. A memory device, comprising:
    a plurality of word lines;
    a controller configured to refresh one of the plurality of word lines during a first refresh cycle in response to a refresh signal;
    a random number generator configured to generate a first number;
    a counter configured to receive the first number as an initial value of the counter and start counting from the initial value in response to the refresh signal, wherein the counting of the counter is triggered by an access signal indicative of an access to one of the plurality of word lines,
    wherein the controller is configured to obtain an address of a first word line that is accessed when the counter reaches zero, and refresh a second word line during a second refresh cycle, wherein an address of the second word line is adjacent to the address of the first word line;
    wherein the random number generator comprises:
    a first logic gate configured to receive a first clock signal and a second clock signal, and generate a third clock signal in response to the first and second clock signals; and
    a second logic gate having a first input terminal configured to receive the third clock signal, a second input terminal, and an output terminal configured to generate a fourth clock signal; and
    a shift register including:
    an input terminal configured to receive the fourth clock signal; and
    an output terminal configured to output the first number in response to the fourth clock signal,
    wherein the output terminal of the shift register is connected to the second input terminal of the second logic gate, such that a bit value associated with the first number is fed backed to the second logic gate, and wherein the second logic gate is configured to generate the fourth clock signal in response to the third clock signal and the bit value.

13. The memory device of claim 12, wherein the first number is in binary and greater than 2-bit.

14. The memory device of claim 12, wherein the shift register is an 8-bit shift register.

15. The memory device of claim 12, wherein the first logic gate and the second logic gate is an XOR gate.

16. The memory device of claim 12, wherein a frequency of the first clock signal is different from a frequency of the second clock signal.

17. The memory device of claim 12, wherein the shift register include two or more flip-flops.

* * * * *